United States Patent
Hallundbæk

(10) Patent No.: US 10,030,500 B2
(45) Date of Patent: Jul. 24, 2018

(54) WELLBORE SURVEILLANCE SYSTEM

(75) Inventor: Jorgen Hallundbæk, Graested (DK)

(73) Assignee: WELLTEC A/S, Allerod (DK)

(*) Notice: Subject to any disclaimer, the term of this patent is extended or adjusted under 35 U.S.C. 154(b) by 710 days.

(21) Appl. No.: 13/701,243

(22) PCT Filed: May 31, 2011

(86) PCT No.: PCT/EP2011/058987
§ 371 (c)(1),
(2), (4) Date: Nov. 30, 2012

(87) PCT Pub. No.: WO2011/151346
PCT Pub. Date: Dec. 8, 2011

(65) Prior Publication Data
US 2013/0075091 A1    Mar. 28, 2013

(30) Foreign Application Priority Data
May 31, 2010   (EP) ..................... 10164469

(51) Int. Cl.
E21B 47/01   (2012.01)
E21B 47/10   (2012.01)
E21B 47/00   (2012.01)
G01V 1/50    (2006.01)

(52) U.S. Cl.
CPC .......... E21B 47/01 (2013.01); E21B 47/0003 (2013.01); E21B 47/10 (2013.01); G01V 1/50 (2013.01)

(58) Field of Classification Search
None
See application file for complete search history.

(56) References Cited

U.S. PATENT DOCUMENTS 2,999,557 A * 9/1961 Smith ............... E21B 33/05
                                              367/181
5,730,219 A * 3/1998 Tubel ............... E21B 47/10
                                              166/113
5,829,520 A * 11/1998 Johnson ............ E21B 43/086
                                              166/250.01

(Continued)

FOREIGN PATENT DOCUMENTS

EA   009357   12/2007
EA   011736    4/2009

(Continued)

OTHER PUBLICATIONS

Russian Office Action issued in related Russian Patent Application No. 2012155128/03 (087449), dated May 13, 2015 (7 pages).
International Search Report for PCT/EP2011/058987, dated Nov. 11, 2011.

(Continued)

Primary Examiner — Caroline N Butcher
(74) Attorney, Agent, or Firm — Nixon & Vanderhye PC

(57) ABSTRACT

A wellbore surveillance system obtains fluid reservoir information data, such as the position and amount of gas, oil and/or water, while draining hydrocarbons from an oil or gas field via a casing in a wellbore in a formation. The casing has a vertical part near a top of the casing and an inner face, the system comprising a first sensor for measuring a content of gas, oil and/or water in the formation, and a second sensor for measuring a content of gas, oil and/or water in the formation.

49 Claims, 10 Drawing Sheets

(56) References Cited

U.S. PATENT DOCUMENTS

| | | | | |
|---|---|---|---|---|
| 5,959,547 | A * | 9/1999 | Tubel | E21B 23/03 166/372 |
| 6,268,911 | B1 * | 7/2001 | Tubel | E21B 23/03 250/256 |
| 2003/0047308 | A1 * | 3/2003 | Hirsch | E21B 17/003 166/250.15 |
| 2003/0098799 | A1 * | 5/2003 | Zimmerman | E21B 47/122 340/854.6 |
| 2004/0238166 | A1 * | 12/2004 | Salamitou | E21B 47/01 166/255.1 |
| 2005/0060096 | A1 * | 3/2005 | Hutchinson | E21B 47/04 702/6 |
| 2006/0005965 | A1 * | 1/2006 | Chouzenoux | E21B 47/0006 166/250.11 |
| 2006/0157239 | A1 * | 7/2006 | Ramos | E21B 47/10 166/254.2 |
| 2011/0060527 | A1 * | 3/2011 | Teodorescu | E21B 47/01 702/9 |

FOREIGN PATENT DOCUMENTS

| | | |
|---|---|---|
| EA | 1022736 | 4/2009 |
| EP | 2374440 | 10/2011 |
| RU | 2236549 | 9/2004 |
| RU | 2008101909 | 7/2009 |
| RU | 2374440 | 11/2009 |
| SU | 256804 | 3/1970 |
| SU | 265804 | 3/1970 |
| SU | 1347744 | 4/1995 |
| WO | WO 98/12417 | 3/1998 |
| WO | WO 98/50680 | 11/1998 |
| WO | WO 03/002850 | 1/2003 |
| WO | WO 2004/083790 | 9/2004 |
| WO | WO 00/00850 | 1/2006 |

OTHER PUBLICATIONS

Written Opinion of the International Searching Authority for PCT/EP2011/058987, dated Nov. 11, 2011.

* cited by examiner

WELLBORE SURVEILLANCE SYSTEM

This application is the U.S. national phase of International Application No. PCT/EP2011/058987, filed 31 May 2011, which designated the U.S. and claims priority to EP Application No. 10164469.8, filed 31 May 2010, the entire contents of each of which are hereby incorporated by reference.

FIELD OF THE INVENTION

The present invention relates to a wellbore surveillance system for obtaining fluid reservoir information data, such as the position and quantity of gas, oil and/or water, while draining hydrocarbons from an oil or gas field via a casing in a wellbore in a formation, the casing having a vertical part near a top of the casing and an inner face, the system comprising a first sensor for measuring a content of gas, oil and/or water in the formation, and a second sensor for measuring a content of gas, oil and/or water in the formation.

BACKGROUND ART

Conventional reflection seismology uses surface sources and receivers to detect reflections from subsurface impedance contrasts in order to obtain data of fluid reservoir information. The obtained image often suffers in spatial accuracy, resolution and coherence due to the long travel paths between source, reflector, and receiver. To overcome this difficulty, a technique commonly known as vertical seismic profiling was developed to image the subsurface in the vicinity of a borehole. By this method, a surface seismic source is placed in the drilling tool, and signals are received by a single downhole receiver or an array of downhole receivers within the same drilling tool. This step is repeated for different depths of the receiver (or receiver array). This method is used for drilling but is also suitable for obtaining fluid reservoir information data in the subsequent production optimising process.

Another known method is to arrange an array of seismic sensors distributed along jointed tubulars (e.g. drill pipe or coiled tubing) to determine the physical condition of the drill string and whether drilling may be optimised. The seismic sensors are configured to detect seismic energy imparted into the adjacent formation by a wellbore source or surface source. This method is used for drilling but is also suitable for obtaining fluid reservoir information data in the subsequent production optimising process.

In addition, an optical fibre can be arranged in the well in order to obtain temperature data of the fluid in the vicinity of the well but not fluid reservoir information data, such as the position and quantity.

DESCRIPTION OF THE INVENTION

It is an object of the present invention to wholly or partly overcome the above disadvantages and drawbacks of the prior art. More specifically, it is an object to provide a method and a system for obtaining fluid reservoir information data, such as the position and the amount of gas, oil, and water, while draining hydrocarbons from an oil or gas field.

The above objects, together with numerous other objects, advantages, and features, which will become evident from the below description, are accomplished by a solution in accordance with the present invention by a wellbore surveillance system for obtaining fluid reservoir information data, such as the position and amount of gas, oil and/or water, while draining hydrocarbons from an oil or gas field via a casing in a wellbore in a formation, the casing having a vertical part near a top of the casing and an inner face, the system comprising:

a first sensor for measuring a content of gas, oil and/or water in the formation, and a second sensor for measuring a content of gas, oil and/or water in the formation, wherein the first and the second sensors are arranged at least partly in a casing wall of the casing, and the second sensor is arranged at a distance from the first sensor.

Having two sensors at a distance from one another makes it possible for one sensor to send out a signal in the formation and for the other sensor to detect the response from that signal. In this way, fluid reservoir information data can be obtained.

The wellbore surveillance system according to the invention may further comprise a second casing arranged in a second wellbore and comprising a first sensor for measuring a content of gas, oil and/or water in the formation, and a second sensor for measuring a content of gas, oil and/or water in the formation, wherein the first and the second sensors are arranged at least partly in a casing wall of the second casing, and the second sensor is arranged at a distance from the first sensor.

In one embodiment of the invention, the casing may have a second part more horizontal than the first part, and the sensors may be arranged in this second part.

By arranging the sensors in the second, more horizontal part, fluid reservoir information data can be obtained from a larger distance than with known measuring tools lowered into a well.

Furthermore, the system may have more than five sensors, preferably more than ten sensors, and more preferably more than twenty sensors.

In one embodiment, the first sensor may comprise at least one transmitter of a first signal, at least one receiver receiving the first signal and/or a second signal, and at least one transferring device, and the second sensor may comprise at least one transmitter of the second signal, at least one receiver of the first signal and/or the second signal, and at least one transferring device.

When each sensor has a transmitter and a receiver, the system may still function if one transmitter or receiver in a sensor breaks down.

In another embodiment, the sensors may be arranged in an opening in the inner face of the wall of the casing or a through-hole in the wall of the casing.

Moreover, the sensors may be arranged in the wall of the casing, forming part of an outer face of the casing and in contiguity with the well fluid and/or the formation.

Also, the sensors may extend from the inner face of the casing and into the formation surrounding the casing.

Further, the transmitter may be an acoustic transmitter.

In one embodiment, the acoustic transmitter may comprise a hammer or a weight.

Additionally, the acoustic transmitter may comprise a motor for pulling the weight in one direction and releasing the weight which, by means of a spring means, is forced in a second direction opposite the first direction towards the formation to abut the formation.

Furthermore, the receiver may comprise an acoustic receiver.

In one embodiment, the acoustic receiver may be an accelerometer.

In another embodiment, the receiver may comprise a motor for pulling the acoustic receiver in one direction and subsequently forcing the acoustic receiver, by means of a spring means, in a second direction opposite the first direction towards the formation to abut the formation.

In addition, the motor may pull the weight or the acoustic receiver in one direction by means of a rotating shaft.

Also, the acoustic receiver may be a microphone.

Furthermore, the first sensor may comprise a first and a second electrode for providing a current flowing from the first electrode to the second electrode to conduct a resistivity measurement or a conductivity measurement of the formation in order to determine the content of gas, oil and/or water in the formation.

Moreover, the sensor may comprise a microchip for transforming the signal or the resistivity or conductivity measurement into data and/or for storing and/or transferring the data, or for storing a representation of the data.

The present invention as described above may further comprise at least one tool comprising a communication device for receiving data from the transferring devices when the tool is in the casing.

Also, the present invention may comprise at least one tool comprising an acoustic transmitter having a weight connected with a rotatable shaft rotated by a motor in the tool.

Further, the tool may comprise an anchor section for anchoring the tool within the casing.

In one embodiment, the anchor section may comprise at least a first anchor extending in a first radial direction of the tool and a second anchor extending in a second direction opposite the first direction, the extension of the anchors from an outer face of a tool housing varying so that the tool is anchored in an eccentric relationship to the casing.

Furthermore, the tool may comprise a driving unit, such as a downhole tractor.

In one embodiment, the tool may comprise means for making a cavity in the casing. The means for making a cavity may be a drilling unit.

Moreover, the tool may comprise means for arranging a sensor in the cavity.

In one embodiment, the means for arranging the sensor in the cavity may be a rotating arm for rotating the sensor so that a thread of the sensor engages a thread in the cavity.

In addition, the transferring device and the communication device in the tool may use radio frequency for transferring data to the tool.

Moreover, the transmitter and the receiver of the sensor may be integrated as one unit.

Additionally, the transferring device may comprise a radio frequency identification tag, and the communication device may comprise a radio frequency identification reader.

In an embodiment of the invention, the sensor may comprise a battery for powering at least the transmitter and the receiver.

Furthermore, the tool may be connected with a wireline for powering the tool and for transmitting data to above the wellbore.

In addition, the tool may comprise a battery for powering the tool.

Moreover, the tool or the communication device may comprise a powering device for powering the sensor.

In another embodiment, the powering device and the sensor may comprise an inductive coupling for transferring power from the tool to the sensor through induction.

Furthermore, the inductive coupling may be used for transferring data from the sensor to the tool.

Additionally, the sensor may comprise a processor for transforming the signal or the resistivity or conductivity measurement into data and/or for storing and/or transferring the data, or for storing a representation of the data.

In an embodiment, these signals may be generated by acoustics.

In yet another embodiment, the transferring unit in one sensor may have a wireless communication means for communicating wirelessly with another wireless communication means in another sensor or with a wireless communication means in a communication device arranged closer to the top of the casing.

Moreover, the system may comprise several communication devices arranged at a predetermined mutual distance along the casing to the top of the casing, the distance being determined by the distance over which two devices are capable of communicating wirelessly with each other.

In addition, the system may comprise several sensors with wireless communication means arranged at a predetermined mutual distance along the casing to the top of the casing, the distance being determined by the distance over which two devices are capable of communicating wirelessly with each other.

Also, the system may comprise a hammering device arranged at surface or seabed for transmitting acoustic waves into the formation.

Additionally, the signal may be a low frequency acoustic or sonic signal at a frequency of 1 Hz-100 kHz, preferably 10-50 kHz, and more preferably 15-35 kHz.

Furthermore, the invention relates to a downhole tool for reading the data of the sensors in the downhole system as described above, wherein the tool may comprise driving means, such as wheels, for driving the tool forward in the casing, and a communication device as described above.

The present invention further relates to a method for installing the system as described above, comprising the steps of:

providing a number of cavities at a distance from one another in the casing in the wellbore, and arranging the sensors in the wellbore surveillance system according to the invention in the cavities.

The method may further comprise the step of positioning a tool downhole outside a sensor in order to transfer fluid reservoir information data from the sensor to the tool.

In addition, the method may further comprise the steps of loading power from the tool to the sensor, transmitting a signal by means of the transmitter or providing a current from the first electrode, receiving the signal by means of the receiver or receiving the current by means of the second electrode, transforming the signal or current into data, and transferring data from the sensor to the tool.

Furthermore, the present invention relates to a production optimising method, comprising the steps of:

transmitting a first signal by means of a first transmitter of the sensors in the wellbore surveillance system according to the invention, receiving the first signal by means of several receivers, transforming the first signal into data, transferring data from the sensor to a neighbouring sensor and to communication devices all the way to surface, transmitting a second signal by means of a second transmitter of the sensors at a predetermined period of time from the transmission of the first signal, receiving the second signal by means of several receivers, transforming the second signal into data, and transferring data from the sensor to a neighbouring sensor and to communication devices all the way to surface.

Said production optimising method may further comprise the steps of:

exciting the formation by transmitting acoustic waves into the formation by means of several sensors at a time to enhance production of fluid into the wellbore, measure an impact of the exciting of the formation by transmitting a signal by means of one transmitter of the sensors, receiving the signal by means of several receivers, transforming the signal into data, transferring data from the sensor to a neighbouring sensor and to communication devices all the way to surface.

Also, the production optimising method according to invention may further comprise the steps of lowering a logging tool into the casing and logging the content of gas, oil and/or water in the fluid in the casing.

Finally, the production optimising method according to the invention may further comprise the steps of storing data from the sensors of several wells and processing the data into a three-dimensional model of the formation with regard to the content of gas, oil and/or water in the formation.

BRIEF DESCRIPTION OF THE DRAWINGS

The invention and its many advantages will be described in further detail below with reference to the accompanying schematic drawings, which for the purpose of illustration show some non-limiting embodiments and in which.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
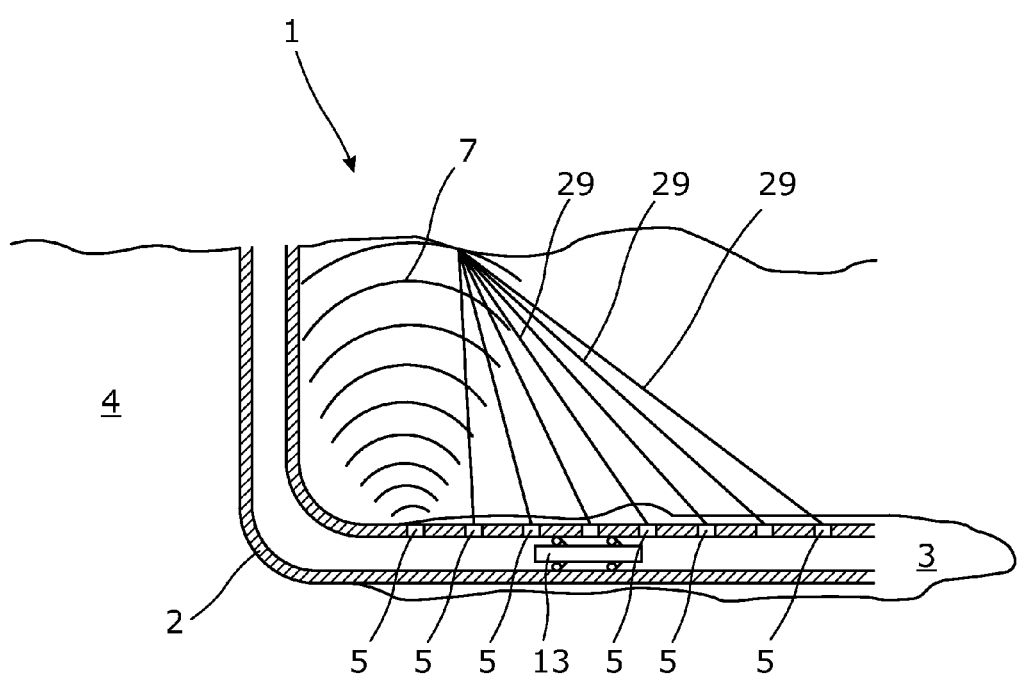
FIG. 1 shows a wellbore surveillance system arranged in a casing downhole.

FIG. 1 shows a wellbore surveillance system 1 for obtaining fluid reservoir information data. When the formation 4 is drained of oil, the oil layer decreases, and the water becomes dominating. The oil runs up through a production casing 2, and eventually, the water will enter into the production casing and disturb the production of oil. In order to prevent the water from destroying the oil production, it is desirable to obtain information about the fluid reservoir and the amount and position of gas, oil and water while draining hydrocarbons from an oil or gas field. In order to be able to obtain such data, the system comprises at least two sensors 5. One sensor 5 sends out a signal 7 in the formation 4, and the response 29 is received by the other sensor or the same sensor. Having several sensors 5 makes it possible to obtain more detailed information about the reservoir by comparing the data from one sensor 5 with the data from another sensor. The system shown in FIG. 1 comprises eight sensors 5 arranged with a mutual distance between them and spread out along the substantially horizontal part of the casing 2.

When the signal 7 passes the different layers of oil, gas and water, it changes, and these are the changes detected by the sensors 5 as a response. In order to analyse the data obtained by the sensors 5, a downhole tool 13 is lowered into the casing 2. The data is transferred from the sensors 5 to the tool 13, and when the tool reaches the surface, the data is analysed to obtain a profile of the layers of water, gas and oil.

The signal 7 transmitted is an acoustic signal, such as the signal used in seismic analysis. Seismic analysis pertains to waves of elastic energy, such as that transmitted by P-waves and S-waves, in the frequency range of approximately 1 to 100 Hz. Seismic energy is studied to interpret the composition, fluid content, extent and geometry of rocks in the subsurface.

The seismic data is analysed when it has been transferred from the tool 13 to an analysis system subsurface. The seismic data can be used for modelling geo-physical attributes and shapes or a geologic causal model of all rock properties, such as temperature, pressure, velocity, viscosity, etc. Furthermore, the data can be used for determining petrophysical effects and for indentifying fluid traps, reserves, recovery and risk.

The tool 13 may also be connected with a wireline 16 by means of which the data is transferred to the surface. In this way, the tool can stay in the casing over a longer period of time, even during production, and the data is sent to the surface almost immediately after it has been transferred to the tool 13. The tool 13 is powered by the wireline, but may also be powered by a battery 17.

As can be seen in FIG. 1, the tool 13 has wheels 23 for driving the tool forward in the casing 2, and when the tool reaches a position opposite a sensor 5, the data is unloaded. Subsequently, the tool 13 moves on to the next sensor 5 to unload data from that sensor and so forth.

The sensor 5 has a transmitter 6 for transmitting a first signal 7 and a receiver 8 for receiving the first signal. The receiver 8 in a first sensor 5 receives both the response of a signal 7 sent from the transmitter 6 of the first sensor 5 and the response of a signal sent from the transmitter of a second sensor. Furthermore, the sensor 5 comprises a transferring device 9 to be able to transfer data away from the sensor. The sensor 5 is arranged in the casing wall 30 in a bore. The sensor 5 is fastened in the bore by means of threads or snap-fit fasteners.

Figure 2:
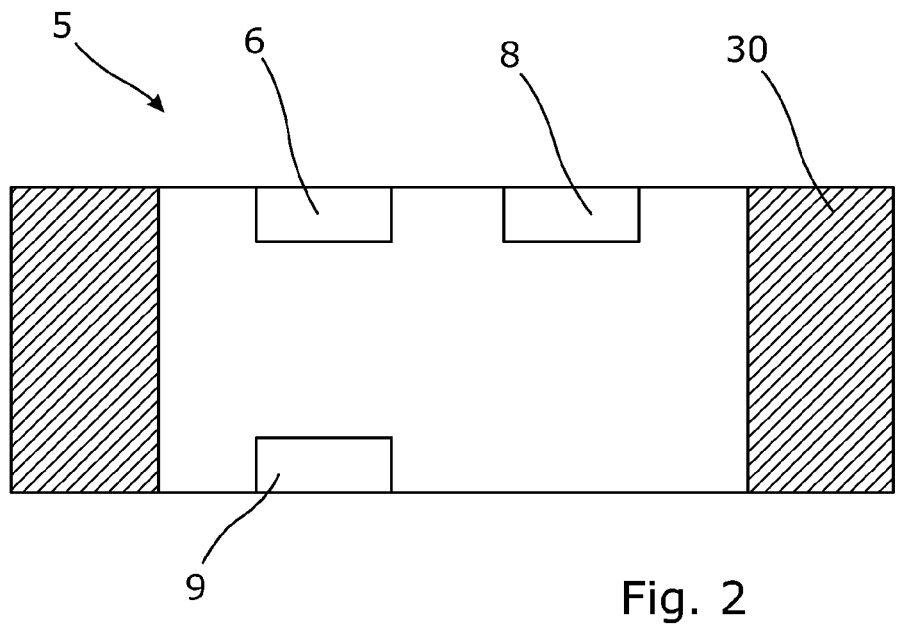
FIG. 2 shows a sensor according to the invention.

The sensor 5 of FIG. 2 is powered by the tool 13 when it is positioned opposite the sensor in the casing 2. While the tool 13 powers the sensor 5, the sensor is able to transmit and receive signals 7 to obtain fluid reservoir information, and the information received from the receiver 8 is transferred to the tool 13 as it is received by the receiver. Then, the tool 13 moves to the next sensor 5, and the operation is repeated.

Figure 3:
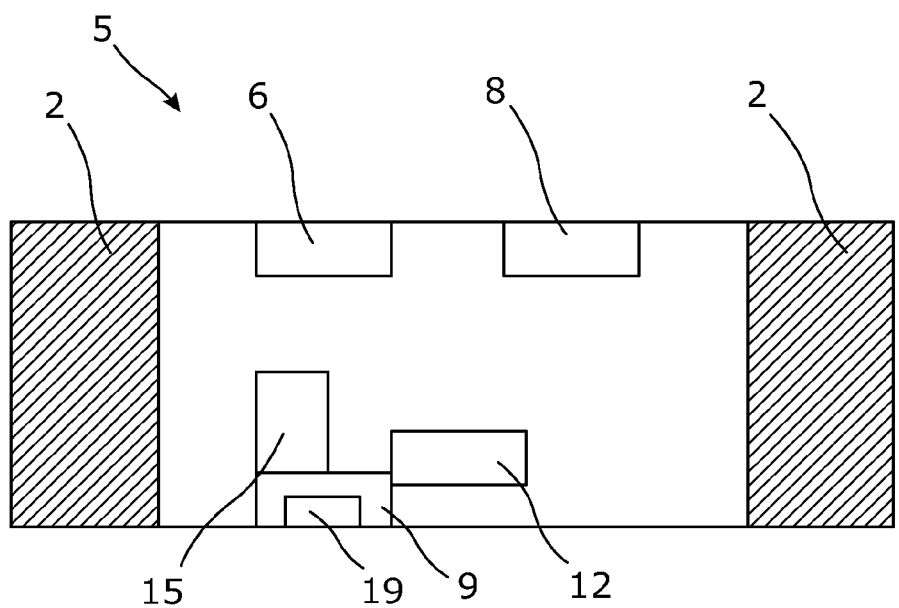
FIG. 3 shows another embodiment of the sensor.

The sensor 5 in FIG. 3 comprises a microchip 12, such as a microcontroller, for transforming the response received by the receiver 8 into digital data. The micro-controller comprises static RAM for storing the data. The sensor 5 comprises a transferring device 9 for transferring the data to the tool 13, which in this embodiment comprises an inductive coupling 19 matching an inductive coupling 20 of the tool 13 for transferring the data by means of inductance. The sensor 5 also has a battery 15 for powering the sensor over a period of time. In this way, the sensor 5 is able to perform measurements on the fluid reservoir without the tool 13 being present. The sensor 5 is programmed, e.g. by means of a timer, to conduct a measurement each time a predetermined period of time has passed and to store the data until it can be transferred to the tool 13 or another device.

Figure 4:
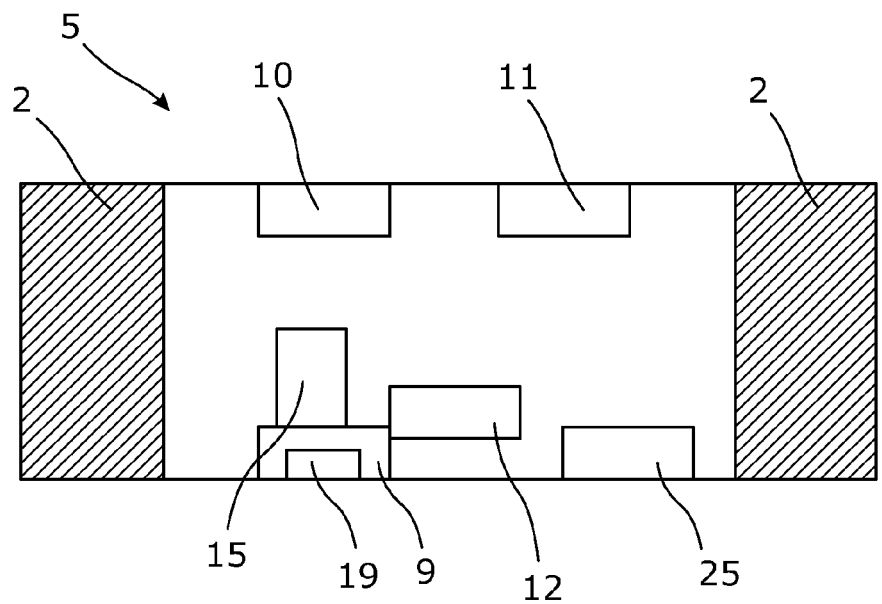
FIG. 4 shows yet another embodiment of the sensor.

As shown in FIG. 4, the sensor 5 comprises a wireless communication means 25 for communicating wirelessly with another sensor, the tool 13 or another communication device. The sensor 5 in FIG. 4 has two electrodes 10, 11 instead of a transmitter 6 and a receiver 8. The electrodes 10, 11 are used for resistivity or conductivity logging or measurements. When measuring the resistivity, a current is passed between the two electrodes, and the potential drops between them provide the resistivity of the fluid present in the formation 4. When measuring the conductivity, a current is induced in the formation, and the capacity to carry the current is observed. By resistivity or conductivity measurement is meant the response measured by the sensor 5, e.g. the capacity or the potential drop.

Figure 5:
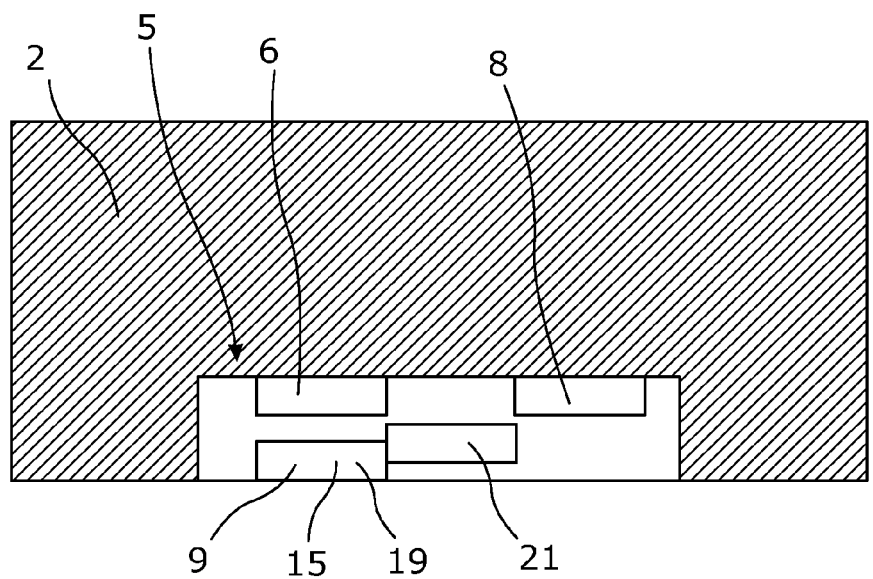
FIG. 5 shows yet another embodiment of the sensor.

In FIGS. 2-4, the sensor 5 is arranged in a through-hole in the casing 2, but the sensor may also be positioned in a cavity in the casing, as shown in FIG. 5. When the sensor 5 is arranged in only part of the casing 2, the sensor itself does not have to withstand the pressure difference between the annulus and the inside of the casing.

The sensor 5 of FIG. 5 comprises a battery 15, an inductive coupling 19 and a processor 21 in which the memory and a communication means in the form of an input/output interface are arranged. The inductive coupling 19 and the battery 15 may be arranged in one unit. The processor 21 may also comprise a radio frequency identification device (RFID) to be read by a radio frequency identification reader in the communication device 26 of the tool 13.

Figure 6:
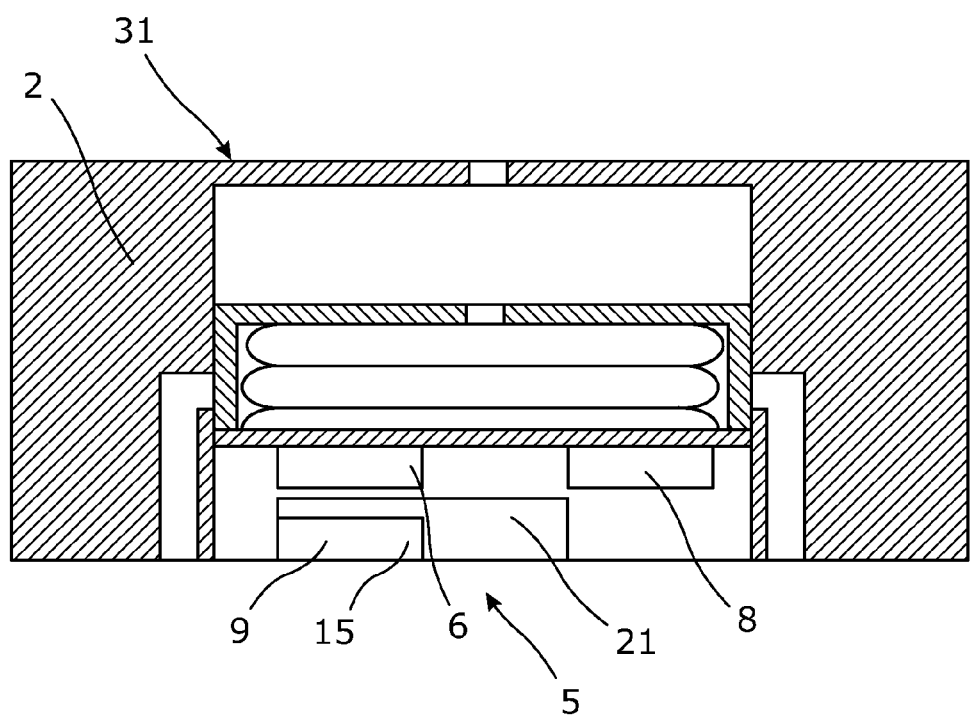
FIG. 6 shows yet another embodiment of the sensor.

In FIG. 6, the system also comprises a valve 31, such as an inflow control valve, arranged adjacent to the sensor 5, enabling signals 7 from the sensor to close the valve if measurements show that the water layer is too close to the sensor and thereby the valve. In this way, the valve 31 is shut off before letting water into the casing 2. The tool 13 of the system 1 moves inside the casing 2 in order to read data from the sensors 5 and subsequently transfer the data to the surface. The tool 13 in FIG. 7 comprises wheels 23 for moving within the casing 2, but may as well comprise other driving means, such as a caterpillar track, legs or similar means. The tool 13 is powered through a wireline 16 for powering a motor driving a pump and thereby the wheels 23. The tool 13 comprises a communication device 14 for transferring data from the sensor 5. When the communication device 14 is positioned opposite the sensor 5, the data can be transferred.

Figure 7:
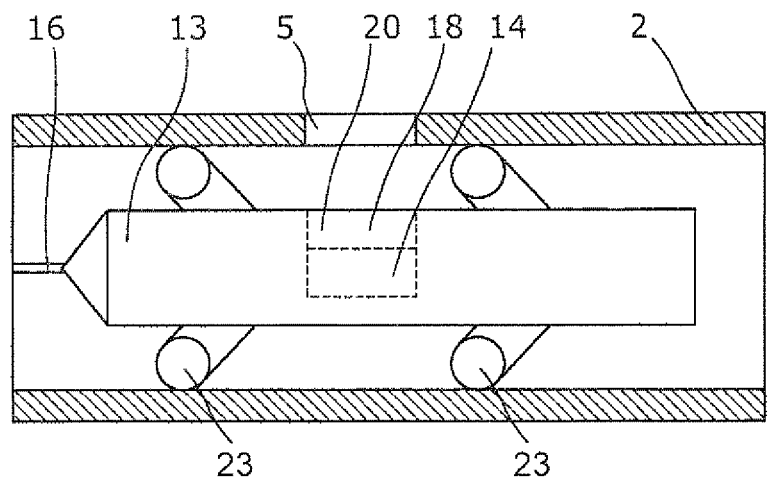
FIG. 7 shows a partial view of the system.

The tool of FIG. 7 also comprises a powering device 18 for powering the sensor, if needed. If the sensor 5 does not have its own power, the tool 13 can transfer power to the sensor, which then performs a measurement, and the data is thus transferred to the tool 13 without being stored in the sensor first. In this way, the sensor 5 can be a very simple sensor with very few components. One way of transferring power to the sensor 5 is to use an inductive coupling 20 interacting with an inductive coupling 19 in the sensor 5. The power may also be transferred to the sensor 5 in another suitable way, such as by mean of microwaves, infrared light or lasers.

Figure 8:
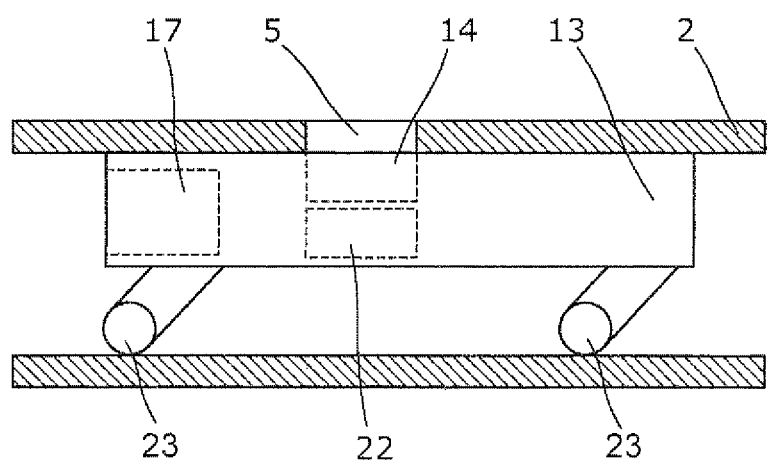
FIG. 8 shows a partial view of another embodiment of the system.

The tool 13 may also hold its own power by comprising a battery 17, as shown in FIG. 8. In this event, the tool 13 may stay in the casing 2 for a period of time when all the sensors 5 have been read several times and then emerge to the surface for data unloading. The legs holding the wheels 23 have been retracted in the tool of FIG. 8, enabling the tool to rest against the inner surface of the casing 2 and thus against the outer surface of the sensor 5. This facilitates more efficient transferral of data from the sensor 5 and/or power to the sensor. If needed, the tool 13 may have a connection means for providing a direct electrical connection with the sensor 5.

Figure 9:
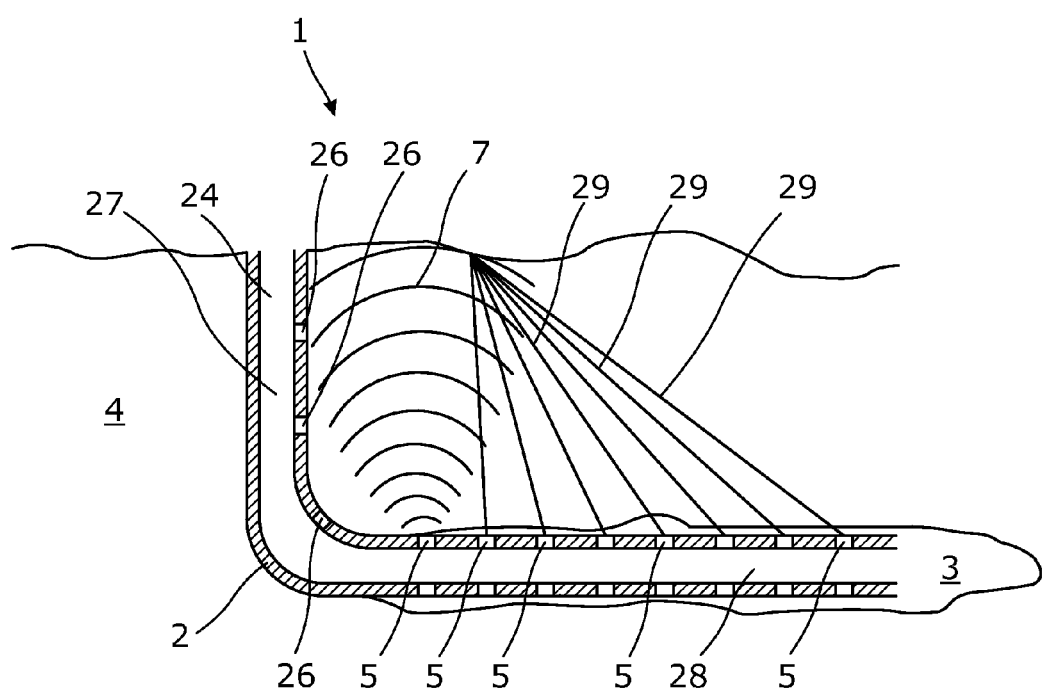
FIG. 9 shows yet another embodiment of the system.

In FIG. 9, the system 1 comprises several communication devices 26 distributed along the casing 2 from the last sensor 5 to the top of the well. In this way, the wireless communication means 25 of the sensors 5 can transfer data to the next sensor or to the communication device 26 if the communication device is next in line. The communication device 26 then communicates the data to the next communication device and so forth until the data reaches to top of the casing 24 or well. By having the communication devices 26, a tool 13 is not needed for obtaining the data in each sensor 5.

The wireless communication may occur by means of radio frequency communication, electromagnetic communication, WIFI, or by acoustic waves transmitted through the casing wall.

Figure 10:
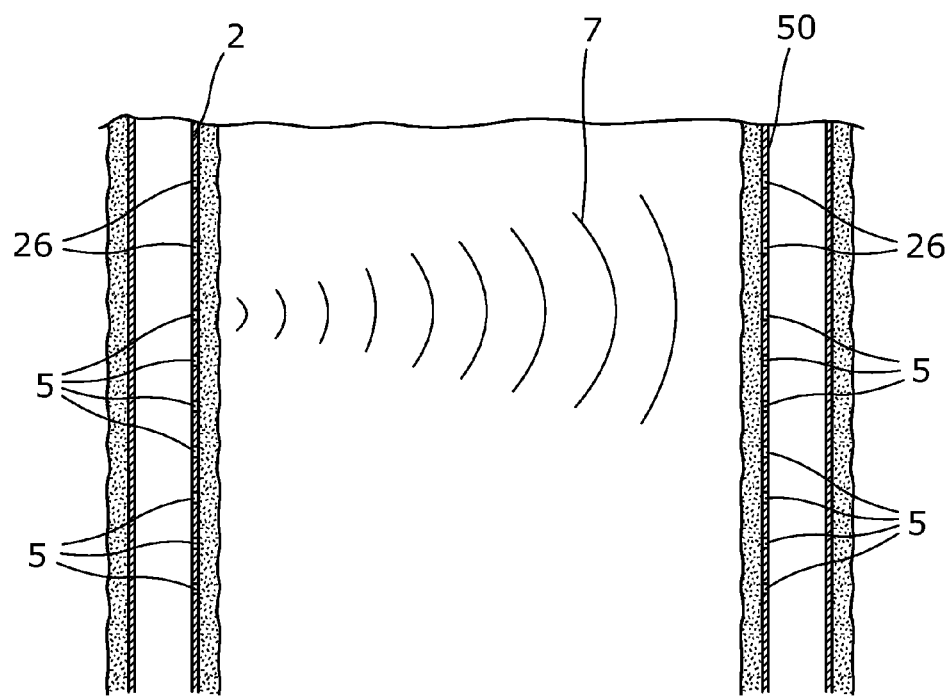
FIG. 10 shows yet another embodiment of a wellbore surveillance system including sensors in neighboring casings.

As can be seen in FIG. 10, the wellbore surveillance system may further comprise a second casing 50 arranged in a second wellbore and comprising a plurality of sensors for measuring a content of gas, oil and/or water in the formation, which are arranged at least partly in the casing wall of the second casing at a distance from each other. In this way, a first signal 7 transmitted by one transmitter 6 in a sensor 5 in the first casing 2 can be received by a receiver in a sensor in the second casing 50. The signal has thus passed through the formation about which knowledge of the content of gas, oil and/or water is desired, and a system having sensors in two neighbouring casings provides more accurate data than a system having only one casing 2. The second casing 50 also comprises several communication devices 26 distributed along the casing 2 from the last sensor 5 to the top of the well.

Figure 11:
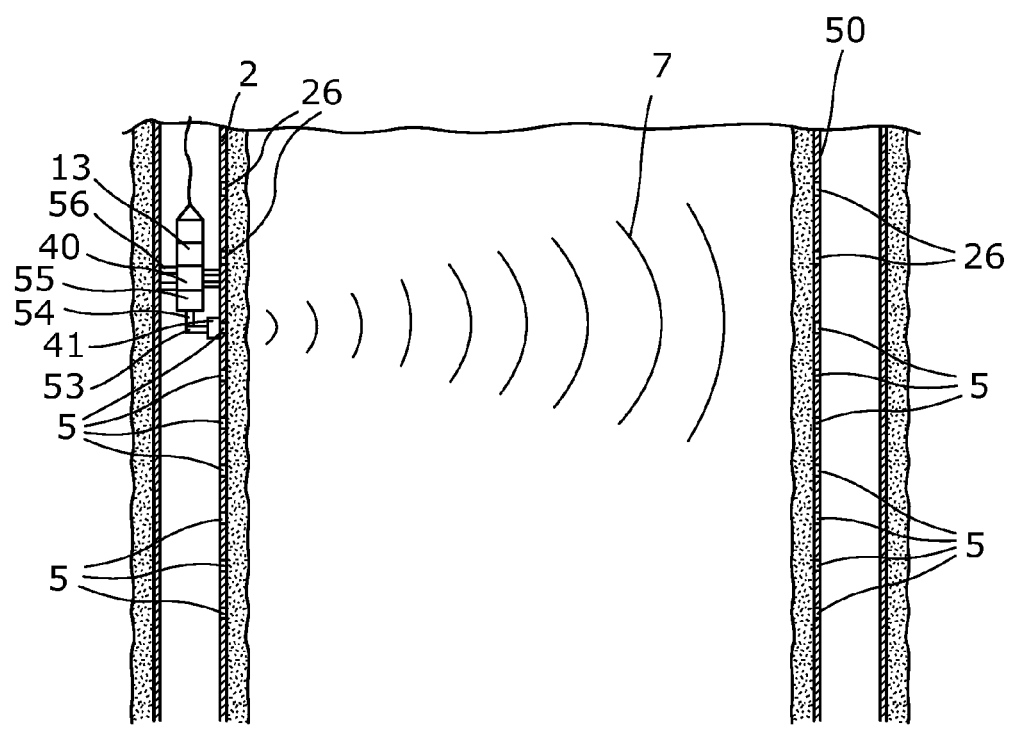
FIG. 11 shows yet another embodiment of a wellbore surveillance system with a tool submerged into a casing.

In the event that the transmitter in the sensors is not sufficient to transmit a strong enough signal for the receivers to receive, a tool 13 may be submerged into a casing 2 as shown in FIG. 11. In order to generate a strong signal, the tool comprises an acoustic transmitter 53 comprising a weight 41 which is rotated by means of a rotatable shaft 54 to abut the casing wall and in this way transmit acoustic waves into the formation. The shaft is rotated by means of a motor 55 arranged in the tool housing. The tool comprises an anchor section 40 having anchors projecting radially from the tool housing to anchor the tool in an eccentric manner in the casing so that the distance from the tool housing to the casing wall in one direction is smaller than the distance from the tool housing to the casing wall in another direction opposite the one direction. In this way, the centre axis of the tool is offset in relation to the centre axis of the casing.

When the weight is rotated by the shaft, the weight hammers into the casing wall once along the inner circumference of the casing, generating one acoustic signal per revolution of the shaft. In this way, a pattern of acoustic signals is generated which is recognisable by the sensors in the first casing and/or in the second casing 50. In another embodiment, the tool comprises a hammer generating the acoustic signal by means of a motor.

The signals are low frequency acoustic or sonic signals at a frequency of 1 Hz-100 kHz, preferably 10-50 kHz, and more preferably 15-35 kHz.

Figure 12:
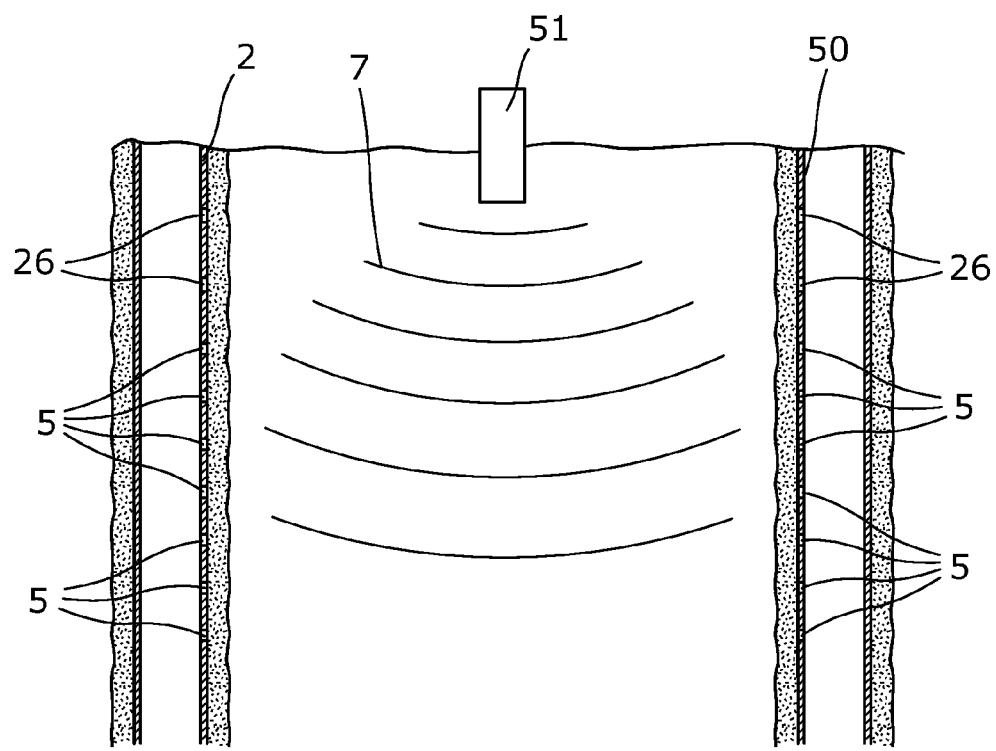
FIG. 12 shows yet another embodiment of a wellbore surveillance system with a signal provided at a surface or a seabed.

In FIG. 12, the signal transmitted into the formation is provided by a hammering device arranged at the surface or the seabed. The hammering device 51 may be arranged partly in the ground or in the formation. The signal of the hammering device is thus received by sensors in both casings or in one casing alone. The signal received in the receivers of the sensors is thus not a signal which has travelled to the surface or seabed before being received in the sensors. Before being received in the receivers, the signal has only travelled more or less directly through the formation, resulting in a more accurate result.

As shown in FIGS. 2-6, the sensors are arranged in an opening in the inner face of the wall of the casing or a through-hole in the wall of the casing. The sensors are easily installed after completing the well by making a hole in the casing wall and inserting the sensor in that hole. The sensors may thus be arranged in the wall of the casing, forming part of an outer face of the casing and in contiguity with the well fluid and/or the formation. If the casing is cemented in, the sensors do not have to extend beyond the outer face of the casing, but if the casing is surrounded by an annulus, the sensors may have to extend from the inner face of the casing and into the formation surrounding the casing, and thus the axial extension of the sensors are longer than the smallest thickness of the casing wall.

Figure 13:
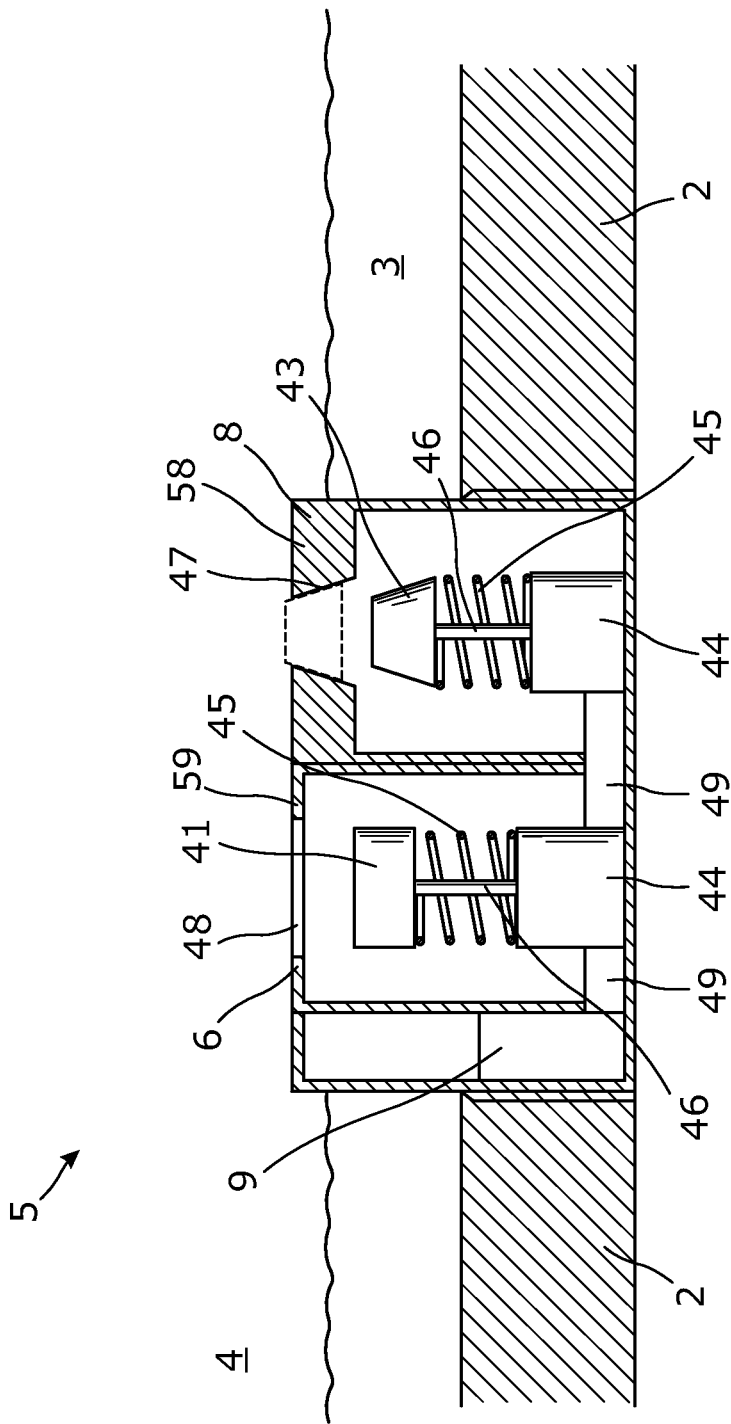
FIG. 13 shows yet another embodiment of a sensor.

When the signal is an acoustic signal, the transmitter is an acoustic transmitter and the receiver is an acoustic receiver 43. The acoustic transmitter 53 comprises a hammer or a weight 41. In FIG. 13, the acoustic transmitter comprises a motor 44 for pulling the weight 41 in one direction and releasing the weight which, by means of a spring means 45, is forced in a second direction opposite the first direction towards the formation to abut the formation. The weight is forced out through an opening 48 in a housing 59 of the transmitter and can thus hammer against the formation, generating an acoustic signal.

The acoustic receiver 43 may be any suitable receiver such as an accelerometer, a microphone or similar acoustic receiver 43. The receiver may be a low frequency receiver of between 10-100 Hz. Not all acoustic receivers are capable of withstanding a hammering motion from a nearby transmitter without getting seriously damaged, and in such event, the receiver comprises a motor 44 for pulling the acoustic receiver 43 in one direction to ensure that the acoustic receiver is out of contact with a receiver housing 58 and that the acoustic receiver is surrounded by fluid while the weight has hammered against the formation or the casing. When the transmitter has transmitted its signal, the acoustic receiver is then forced, by means of a spring means 57, in a second direction opposite the first direction towards the formation to abut the formation and is consequently capable of receiving the signal, which is as illustrated by a dotted line in FIG. 13.

The motors of the transmitters or the receivers pull the weight or the acoustic receiver in one direction by means of a rotating shaft 46 which is rotated into the motor for pulling the weight or the acoustic receiver and forced in the opposite direction by a spring means 45 arranged between the weight or the acoustic receiver and the respective motor. The receiver comprises a tapering opening 47 to guide the acoustic receiver when forced towards the formation. Instead of a motor, an electromagnet may be arranged so when activated, the electromagnet pulls in the acoustic receiver or the weight.

The transmitter and the receiver are electronically connected via an electronic control 49 and they are in turn electronically connected via an electronic control 49 to a transferring device 9 for transferring data from this sensor to a neighboring sensor in order to get the data upwards to the communication devices 26 and thus up to the surface. As can be seen in FIG. 13, the sensor extends into the formation through the casing wall and the annulus or wellbore 3.

The communication devices 26 distributed along the casing can thus also be used for sending control signals down to the sensors in order to control which transmitter is transmitting a signal. In another embodiment, the sensors comprise a timer for controlling when a transmitter is to send a signal and when the receivers are to receive that signal. The sensors may be equipped with timers with programmed, predetermined intervals prescribing when to activate the sensor and when to also activate the transmitter of that sensor. The sensors may thus be pre-programmed prior to installation following a surveillance plan according to which the sensors are activated once a year, half a year or whatever is appropriate. In this way, it is not necessary to submerge a tool in order to activate the sensors. Instead, the sensors activate themselves according to their programming and then send their data up to surface.

In FIG. 1, the sensors 5 are arranged in the casing wall 30 so that only one sensor is arranged in the same circumferential plane of the casing. The sensors 5 may also be arranged in the same circumferential plane of the casing 2 and have a circumferential distance to one another, as shown in FIG. 9.

The wellbore surveillance system may furthermore be used as formation logging method comprising the steps of transmitting a first signal by means of a first transmitter of one sensor, receiving the first signal sent by that sensor by means of several receivers in other sensors. Subsequently, the first signal is transformed into data and the data is transferred from the sensor to a neighbouring sensor. This step of transferring data is repeated until the data reaches the sensor closest to the top of the well, and then that sensor transfers the data to a communication device which again transfers the data to the next communication device all the way to surface. While doing so, a second signal is transmitted by means of a second transmitter of the sensors at a predetermined period of time from the transmission of the first signal, which is received by means of several receivers, and subsequently the data is transformed and sent to the surface in the same way as the first signal. By receiving the same signal in several receivers, the data can be processed so that a representation of how the oil, gas and water lie in layers or zones in the formation can be made.

If the representation of how the oil, gas and water lie in layers or zones in the formation shows that a zone close to the production zone has an elevated concentration of water, a production optimising method can be executed. The production optimisation method comprises the steps of exciting the formation by transmitting acoustic waves into the formation by means of several sensors simultaneously, thereby enhancing production of fluid into the wellbore. In this way, the formation and the fluid comprised therein are oscillated so that the water is partially levelled out, if not fully levelled out, thereby aiding the oil in entering the production zone of the casing, thereby displacing the water locally outside the casing. Subsequently, the impact of the exciting of the formation is measured by transmitting a signal by means of one transmitter of the sensors, the signal is received by means of several receivers, and so forth as explained above, to provide a representation of the oil, water and gas layers or zones.

In order to evaluate the impact of the exciting of the formation inside the casing, a logging tool is lowered into the casing and the content of gas, oil and/or water in the fluid in the casing is logged or measured, e.g. by means of a capacitance.

In order to present the data, the data from the sensors of several wells are stored and processed into a three-dimensional model of the formation with regard to the content of gas, oil, and/or water in the formation. All data have a time stamp indicating at which time the signal was received, and from that time stamp, the data can be mapped and a three-dimensional model can be made showing a representation of all the data from all the sensors of one or more wells.

By fluid or well fluid is meant any kind of fluid which may be present in oil or gas wells downhole, such as natural gas, oil, oil mud, crude oil, water, etc. By gas is meant any kind of gas composition present in a well, completion, or open hole, and by oil is meant any kind of oil composition, such as crude oil, an oil-containing fluid, etc. Gas, oil, and water fluids may thus all comprise other elements or substances than gas, oil, and/or water, respectively.

By a casing is meant any kind of pipe, tubing, tubular, liner, string, etc. used downhole in relation to oil or natural gas production.

In the event that the system is not submergible all the way into the casing, a downhole tractor can be used to push the system all the way into position in the well. A downhole tractor is any kind of driving tool capable of pushing or pulling tools in a well downhole, such as a Well Tractor®.

Although the invention has been described in the above in connection with preferred embodiments of the invention, it will be evident for a person skilled in the art that several modifications are conceivable without departing from the invention as defined by the following claims.

The invention claimed is:

1. A wellbore surveillance system for obtaining fluid reservoir information data while draining hydrocarbons from an oil or gas field below ground level, comprising:
   a first casing in a first wellbore, the casing having a vertical part near a top of the casing and an inner face;
   a second casing in a second wellbore, the second casing being arranged at a distance from the first casing with a formation located therebetween;
   a first sensor configured to measure a content of gas, oil, and/or water in and/or around the formation;
   a second sensor configured to measure a content of gas, oil, and/or water in and/or around the formation;
   a third sensor configured to measure a content of gas, oil, and/or water in and/or around the formation;
   a fourth sensor configured to measure a content of gas, oil, and/or water in and/or around the formation;
   wherein:
   the first and the second sensors are arranged at least partly in a casing wall of the first casing, and the second sensor is arranged at a distance from the first sensor longitudinally within the first casing;
   the third and the fourth sensor are arranged at least partly in a casing wall of the second casing and the fourth sensor is arranged at a distance from the third sensor longitudinally within the second casing;
   the first sensor is configured to wirelessly communicate with the second sensor;
   the third sensor is configured to wirelessly communicate with the fourth sensor;
   each of the first, second, third, and fourth sensors comprise at least one transmitter configured to transmit acoustic signals into the formation and at least one receiver configured to receive acoustic signals passed thought the formation;
   the first sensor is configured to transmit a first acoustic signal into the formation in a direction of the second casing to be received by the third sensor after the first acoustic signal has passed through the formation; and
   the third sensor is configured to detect an acoustic signal corresponding the first acoustic signal after the first acoustic signal has passed through the formation and reached the third sensor, transform the detected acoustic signal into digital data, and wirelessly transmit the digital data corresponding to the detected acoustic signal to the fourth sensor.

2. A wellbore surveillance system according to claim 1, wherein the sensors are arranged in an opening in the inner face of the wall of the first or second casing or a throughhole in the wall of the first or second casing.

3. A wellbore surveillance system according to claim 1, wherein the sensors are arranged in the wall of the first or second casing forming part of an outer face of the first or second casing and in contiguity with the well fluid and/or the formation.

4. A wellbore surveillance system according to claim 1, wherein the sensors extend from the inner face of the first or second casing and into the formation surrounding the first or second casing.

5. A wellbore surveillance system according to claim 1, wherein the transmitter is an acoustic transmitter.

6. A wellbore surveillance system according to claim 5, wherein the acoustic transmitter comprises a hammer or a weight.

7. A wellbore surveillance system according to claim 5, wherein the acoustic transmitter comprises a motor for pulling the weight in one direction and releasing the weight which, by means of a spring means, is forced in a second direction opposite the first direction towards the formation to abut the formation.

8. A wellbore surveillance system according to claim 1, wherein the receiver comprises an acoustic receiver.

9. A wellbore surveillance system according to claim 8, wherein the acoustic receiver is an accelerometer.

10. A wellbore surveillance system according to claim 8, wherein the receiver comprises a motor for pulling the acoustic receiver in one direction and subsequently forcing the acoustic receiver, by means of a spring means, in a second direction opposite the first direction towards the formation to abut the formation.

11. A wellbore surveillance system according to claim 1, wherein the first sensor comprises a first and a second electrode for providing a current flowing from the first electrode to the second electrode to conduct a resistivity measurement or a conductivity measurement of the formation in order to determine the content of gas, oil and/or water in the formation.

12. A wellbore surveillance system according to claim 11, wherein the first sensor comprises a processor for transforming the signal or the resistivity or conductivity measurement into data and/or for storing and/or transferring the data, or for storing a representation of the data.

13. A wellbore surveillance system according to claim 1, wherein the third sensor comprises a microchip for transforming the detected acoustic signal into the digital data and/or for storing and/or transferring the digital data, or for storing a representation of the digital data.

14. A wellbore surveillance system according to claim 1, wherein each of the first, second, third, and fourth sensors comprise a transferring device configured to transfer data captured by the respective sensor, and the system further comprising at least one tool comprising a communication device for receiving data from at least one of the transferring devices when the at least one tool is in the first or second casing.

15. A wellbore surveillance system according to claim 14, wherein the tool or the communication device comprises a powering device for powering the sensor.

16. A wellbore surveillance system according to claim 15, wherein the powering device and the sensor comprise an inductive coupling for transferring power from the tool to the sensor through induction.

17. A wellbore surveillance system according to claim 16, wherein the inductive coupling is used for transferring data from at least one of the sensors to the tool.

18. A wellbore surveillance system according to claim 1, further comprising at least one tool comprising an acoustic transmitter having a weight connected with a rotatable shaft rotated by a motor in the tool.

19. A wellbore surveillance system according to claim 18, wherein the tool further comprises an anchor section for anchoring the tool within the first or second casing.

20. A wellbore surveillance system according to claim 19, wherein the anchor section comprises at least a first anchor extending in a first radial direction of the tool and a second anchor extending in a second direction opposite the first direction, the extension of the anchors from an outer face of a tool housing varying so that the tool is anchored in an eccentric relationship to the first or second casing.

21. A wellbore surveillance system according to claim 1, wherein the first acoustic signal is received by the third sensors and the fourth sensor after the first acoustic signal has passed through the formation.

22. A wellbore surveillance system according to claim 1, further comprising a plurality communication devices arranged at a predetermined mutual distance along the second casing to the top of the casing, the distance being determined by the distance over which two communication devices of the plurality of communication devices are capable of communicating wirelessly with each other, wherein at least one of the communication devices of the plurality of communication devices is configured to wirelessly receive digital data from the third or fourth sensor, and wirelessly transmit the received digital data to another communication device of the plurality of communication devices.

23. A wellbore surveillance system according to claim 1, wherein each of the first, second, third and fourth sensors includes wireless communication devices, the distance between the first and second sensors in the first casing or the distance between the third and fourth sensors in the second casing is determined by the distance over which two wireless communication devices are capable of communicating wirelessly with each other.

24. A wellbore surveillance system according to claim 1, wherein the system comprises a hammering device arranged at surface or seabed for transmitting acoustic waves into the formation, and the first, second, third, and fourth sensors are configured to detect acoustic signals corresponding to the acoustic waves after the acoustic waves have passed through the formation.

25. A wellbore surveillance system according to claim 1, wherein the first signal is a low frequency acoustic or sonic signal at a frequency of 1 Hz-100 kHz, preferably 10-50 kHz, and more preferably 15-35 kHz.

26. A downhole tool for reading data of the first and second sensors or the third and fourth sensors in the wellbore surveillance system according to claim 1, wherein the tool comprises a propulsion device configured to drive the tool forward in the first or second casing.

27. A method for installing the system according to claim 1, comprising the steps of:
providing a number of through holes at a distance from one another in the first or second casing in the first or second wellbore, and
arranging the sensors in the through holes in the first or second casing of the wellbore surveillance system.

28. A method according to claim 27, further comprising the steps of:
positioning a tool downhole outside at least one of the sensors in order to transfer fluid reservoir information data from the sensor(s) to the tool;
loading power from the tool to one or more of the sensors;
transmitting an acoustic signal by one of the sensor transmitters or providing a current from a first electrode in one of the sensors;
receiving the transmitted acoustic signal by one of the sensor receivers or receiving the current by means of a second electrode in one of the sensors;
transforming, by the sensor receiving the transmitted acoustic signal or the current, the transmitted acoustic signal or current into digital data; and
transferring digital data from the sensor to the tool.

29. A production optimising method, comprising the steps of:
transmitting the first acoustic signal by means of the transmitter of the first sensor in the wellbore surveillance system according to claim 1,
receiving acoustic signals corresponding to the first acoustic signal by means of several receivers in the first sensor, the second sensor, the third sensor, and/or the fourth sensor,
transforming the received acoustic signals corresponding to the first acoustic signal into first digital data,
wirelessly transferring the first digital data from one or more of the sensors to a neighbouring sensor and to communication devices all the way to surface,
transmitting a second acoustic signal by means of a transmitter of the second sensor at a predetermined period of time from the transmission of the first acoustic signal,
receiving acoustic signals corresponding the second acoustic signal by means of several receivers in the first sensor, the second sensor, the third sensor, and/or the fourth sensor,
transforming the received signals corresponding to the second signal into second digital data, and
wirelessly transferring the second digital data from one or more of the sensors to a neighbouring sensor and to communication devices all the way to surface.

30. A production optimising method according to claim 29, further comprising the step of:
exciting the formation by transmitting acoustic waves into the formation by means of several sensors at a time to enhance production of fluid into the wellbore,
measuring an impact of the exciting of the formation by transmitting a signal by means of one transmitter of the sensors,
receiving the signal by means of several receivers,
transforming the received signal into data, transferring data from the sensors to a neighbouring sensor and to communication devices all the way to surface.

31. A production optimising method according to claim 29, further comprising the steps of lowering a logging tool into the first or second casing and logging the content of gas, oil and/or water in the fluid in the first or second casing.

32. A production optimising method according to claim 29, further comprising the steps storing data from the sensors of several wells and processing the data into a three-dimensional model of the formation with regard to the content of gas, oil and/or water in the formation.

33. The system according to claim 1, wherein the first acoustic signal is configured to pass through an underground environment before being received by the third sensor.

34. The system according to claim 1, wherein the second sensor, the third sensor, and the fourth sensor are all configured to receive the first acoustic signal transmitted by the first sensor.

35. The system according to claim 34, wherein the system is configured to process the first acoustic signal received by the second sensor, the third sensor, and the fourth sensor to model an underground environment between the first casing and the second casing.

36. The system according to claim 1, wherein at least the first sensor is arranged in a horizontal section of the first casing.

37. The system according to claim 36, wherein at least the third sensor is arranged in a horizontal section of the second casing.

38. The system according to claim 1, wherein at least the third sensor is arranged in a horizontal section of the second casing.

39. The wellbore surveillance system according to claim 1, wherein the system is configured to operate while hydrocarbons are being drained from an oil or gas field below ground level.

40. The wellbore surveillance system according to claim 1, wherein the second sensor is configured to receive and detect changes in a reflection of the first acoustic signal.

41. The system according to claim 1, wherein the first sensor includes a wireless device configured to wirelessly communicate with a wireless device in the second sensor, the third sensor includes a wireless device configured to wirelessly communicate with a wireless device in the fourth sensor and a plurality of communication devices arranged along the second casing above the third and fourth sensors; and the fourth sensor is configured to detect an acoustic signal corresponding the first acoustic signal after the first acoustic signal has passed through the formation and reached the fourth sensor, transform the acoustic signal detected by the fourth sensor into digital data, and to transmit, via the plurality of communication devices, the received digital data from the third sensor and the digital data transformed by the fourth sensor to a processing system configured to generate, based on the received digital data, a model of the formation.

42. The system according to claim 41, upon the processing system detecting a predetermined condition from analysing the received digital data, controlling the first, second, third and fourth sensors to simultaneously transmit acoustic signals into the formation to enhance production of fluid into the first and/or second wellbore.

43. The system according to claim 1, wherein the first sensor is configured to transmit the first acoustic signal in response to a control signal generated based on a pre-programmed timer included in the first sensor.

44. The system according to claim 1, wherein each of the sensors includes a timer configured to control when the transmitter is controlled to transmit acoustic signals and when the receiver is controlled to receive acoustic signals.

45. A method for measuring characteristics of an underground formation during extraction of hydrocarbons from an oil or gas field below ground level, comprising:

arranging a plurality of first sensors in a first casing;

arranging a plurality of second sensors in a second casing, the second casing being at a distance from the first casing with the underground formation located therebetween, wherein each of the plurality of first sensors in the first casing includes a wireless device configured to wirelessly communicate with a wireless device in one or more other sensors of the plurality of first sensors in the first casing, and each of the plurality of second sensors in the second casing includes a wireless device configured to wirelessly communicate with a wireless device in one or more other sensors of the plurality of second sensors in the second casing;

transmitting a first acoustic signal from at least one sensor of the plurality of first sensors in a direction of the second casing;

receiving, by each of the plurality of second sensors, an acoustic signal corresponding to the first acoustic signal after the first acoustic signal has passed through the underground formation;

generating, at each of the plurality of second sensors, digital data corresponding to the received acoustic signal;

wirelessly transmitting, by a first sensor of the plurality of second sensors that received the acoustic signal, the generated digital data corresponding to the received acoustic signal to a second sensor of the plurality of second sensors;

transmitting, by the second sensor of the plurality of second sensors, the digital data generated by the second sensor and the digital data received from the first sensor of the plurality of second sensors, to a processing system; and analyzing, by the processing system, the received digital data generated by the first sensor of the plurality of second sensors and the received digital data generated by the second sensor of the plurality of second sensors for changes in the first acoustic signal due to passing through the underground formation.

46. The method of claim 45, further comprises: arranging a plurality of communication devices in the second casing above the plurality of second sensors, each of the plurality of communication devices configured for wireless communication with one or more sensors of the plurality of second sensors and/or other communication device of the plurality of second communication devices, and wherein the second sensor of the plurality of second sensors transmits the digital data generated by the second sensor and the digital data received from the first sensor of the plurality of second sensors to the processing system via the plurality of communication devices.

47. A method for measuring characteristics of an underground formation during extraction of hydrocarbons from an oil or gas field below ground level, comprising:

arranging a plurality of first sensors at least partly in a casing wall of a first casing;

arranging a plurality of second sensors at least partly in a casing wall of a second casing, the second casing being at a distance from the first casing with the underground formation located therebetween;

transmitting a first acoustic signal from at least one of the first sensors in a direction of the second casing;

receiving, by each of the second sensors, an acoustic signal corresponding to the first acoustic signal after the first acoustic signal has passed through the underground formation;

generating, at each of the plurality of second sensors, digital data corresponding to the received acoustic signal;

positioning a tool inside of the second casing and moving the tool inside of the second casing such that the tool is posited next to a top sensor of the plurality of second sensors closest to the surface;

wirelessly transmitting the digital data, generated by each of the plurality of second sensor positioned below the top sensor and corresponding to the received acoustic signal, to the top sensor;

when the tool is positioned next to the top sensor of the plurality of second sensors, wirelessly transmitting, by the top sensor positioned in the second casing closest to the surface, the digital data received from each of the plurality of second sensors; and transmitting the data received by the tool to an analysis system at the surface, wherein the analysis system at the surface is configured to analyze the received data for changes in the first acoustic signal due to passing through the underground formation.

48. The method for measuring characteristics of an underground formation according to claim 47, further comprising:

arranging a plurality of communication devices along the second casing between the plurality of second sensors and top of the second casing;

wirelessly transmitting the generated digital data, corresponding to the received acoustic signal, from the plurality of second sensors to a first communication device of the plurality of communication devices;

wirelessly transmitting, by the first communication device, the data received from the plurality of second sensors to the next communication device arranged along the second casing; and transmitting the data received by the plurality of communication devices to the analysis system at the surface.

49. A wellbore surveillance system for obtaining fluid reservoir information data while draining hydrocarbons from an oil or gas field below ground level, the system comprising:

a first casing in a first wellbore, the casing having a vertical part near a top of the casing and an inner face;

a second casing in a second wellbore, the second casing being arranged at a distance from the first casing with a formation located therebetween;

a first sensor and a second sensor at least partly arranged in the first casing, wherein the first sensor includes a wireless communication device configured to wirelessly communicate with a wireless communication device included in the second sensor;

a third sensor and a fourth sensor at least partly arranged in the second casing, wherein the third sensor includes a wireless communication device configured to wirelessly communicate with a wireless communication device included in the fourth sensor, wherein each of the first, second, third, and fourth sensors comprise at least one transmitter configured to transmit acoustic signals into the formation and at least one receiver configured to receive acoustic signals passed thought the formation;

the first sensor is configured to transmit a first acoustic signal into the formation in a direction of the second casing;

the third sensor is configured to receive the first acoustic signal after passing through the formation and wirelessly transfer, using the wireless communication device, data corresponding to the first acoustic signal received by third sensor to the fourth sensor; and the fourth sensor is configured to receive the first acoustic signal after passing through the formation and wirelessly transfer data corresponding to the first signal received by the fourth sensor and the data received from the third sensor to a tool moving in the second casing when the tool is positioned next to the fourth sensor.

* * * * *